United States Patent Office 3,455,837
Patented July 15, 1969

3,455,837
PROCESS FOR THE PRODUCTION OF OPTICALLY BRIGHTENED SYNTHETIC MATERIALS
Erwin Maeder, Aesch, Basel-Land, Peter Liechti, Binningen, and Leonardo Guglielmetti and Adolf Emil Siegrist, Basel, Switzerland, assignors to Ciba Limited, Basel, Switzerland, a company of Switzerland
No Drawing. Filed Oct. 18, 1965, Ser. No. 497,493
Claims priority, application Switzerland, Oct. 27, 1964, 13,917/64
Int. Cl. C09k 1/02; C08g 51/67
U.S. Cl. 252—301.2                    2 Claims

ABSTRACT OF THE DISCLOSURE

A new process is provided for optically brightening synthetic, organic polmeric shaped articles wherein an acylamino compound which is capable of forming an oxazole optical brightener on ring closure is incorporated into the material to be optically brightened. The material with the acylamino compound incorporated in it is then heated at least once to a temperature above 150° C. whereupon the acylamino compound undergoes ring closure to form the optical brightener in situ, thereby providing the optically brightened shaped articles of this invention.

---

It has been found that shaped structures which are optically brightened with oxazole compounds are obtained in a particularly simple and advantageous manner when the starting materials from which said structures are made are heated at least once to a temperature above 150° C., generally advantageously above 200° C., in the presence of an acylamino compound, which is capable of forming an optical brightener with ring closure to an oxazole ring and contains at least one —CO—HN group whose carbon atom is bound to a cyclic carbon atom and whose nitrogen atom is bound to an aromatic nucleus which contains a hydroxyl group in vicinal position to the said bond.

The acylamino compounds to be used in the present invention are, for example, ortho-hydroxyacylamino compounds of the general formula (1) 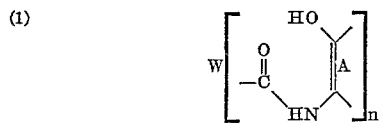

where A represents an aryl radical, W a cyclic residue, which is bound through $n$ cyclic carbon atoms with $n$ —CO—HN groups and contains a chain of conjugated double bonds, and $n = 1$ or 2.

The most advantageous practical route of performing the present invention is a process for the manufacture of optically brightened shaped structures from synthetic, organic, polymeric substances, wherein synthetic, organic, polymeric substances or mixtures used for forming them are heated to temperatures from 150 to 300° C. with acylamino compounds that contain at least one structural element of the formula (2) 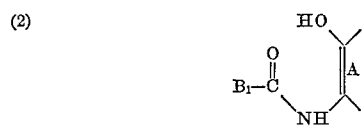

and no further chromophoric groups, where A represents a benzene residue and $B_1$ a residue containing 5-membered or 6-membered cyclic systems of aromatic character which contains 5 to 11 double bonds that are in conjugation both with one another and with the carbonyl group of the formula and belong to phenyl, phenylene, 2,5-thienylene, 2,5-furoylene, benzoxazolyl, naphthoxazole, benztriazole or naphthotriazole residues or to ethylene double bonds conjugated with phenyl radicals. By synthetic, organic, polymeric substances there are to be understood in this context both so-called fully-synthetic and semi-synthetic organic substances, such as are obtained by polymerization, polycondensation or polyaddition or by modification of natural polymeric substances.

As examples of the ortho-hydroxyacylamino compounds of the Formula 1 there may be mentioned the ortho-hydroxy-acylamino compounds of the formulae (3) 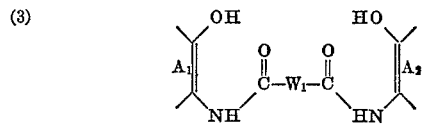

and (4) 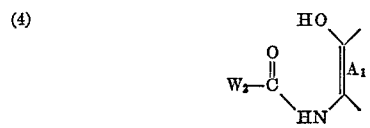

where $A_1$ and $A_2$ represent aryl radicals, $W_1$ represents a cyclic residue, which bound through cyclic carbon atoms with the —CO—HN groups and contains a continuous chain of conjugated double bonds between the two —CO— groups, and $W_2$ represents a cyclic residue, which is bound by a cyclic carbon atom to the —CO—HN group and contains a continuous chain of at least 5 conjugated double bonds which follows upon the —CO— group. Advantageously, $A_1$ and $A_2$ in the above Formulae 3 and 4 stand for benzene residues, $W_1$ for a benzene residue bound to the —CO— groups in the 1,4-position, a stilbene residue bound to the —CO— groups in the 4,4'-position, a furan or thiophene residue bound to the —CO— groups in the 2,5-position, a 1,4-di-[benzoxazolyl-(2', 2")]-benzene residue bound to the —CO— groups in the 6',6"-position, or a 2-[phenyl-(1')]-benzoxazolyl residue bound to the —CO— groups in the 6,4'-position. $W_2$ may represent, for example, a stilbene residue bound to the —CO— group in the 4-position, a 5-phenylthiophene residue bound to the —CO— group in the 2-position, or a 4'-[benzoxazolyl-(2")]-stilbene residue bound to the —CO— group in the 4-position.

Of the ortho-hydroxyacylamino compounds to be used in the present invention those may be specially mentioned which correspond to the formula (5) 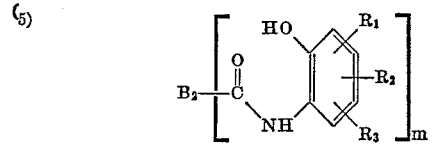

where $m = 1$ or 2 and $B_2$, when $m = 2$, represents one of the following bivalent residues:

(6a) 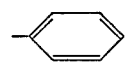

(6b) 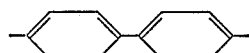

(6c) 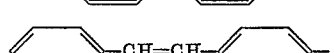

(6d) 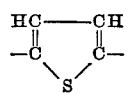

(6e) 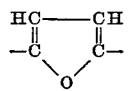

(6f) 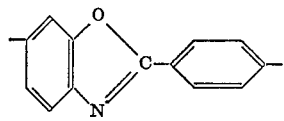

(6g) 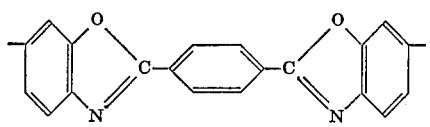

or, when $m=1$, represents one of the following monovalent residues:

(7a) 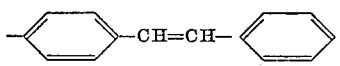

(7b) 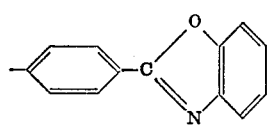

(7c) 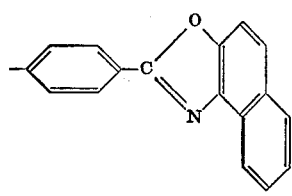

(7d) 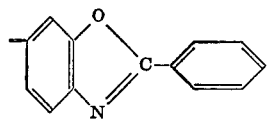

(7e) 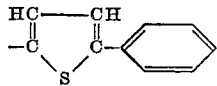

(7f) 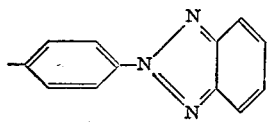

(7g) 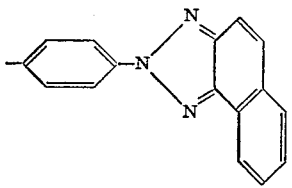

(7h) 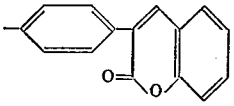

(7i) 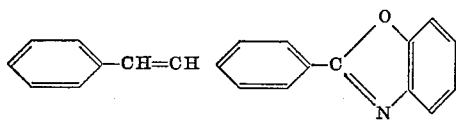

(7k) 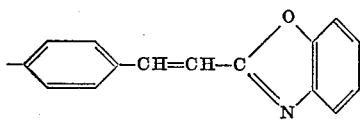

(The meanings of $R_1$, $R_2$ and $R_3$ are defined below.)

The compounds of the Formula 5 may also be subdivided into two types of compounds which are then represented by the formulae (8) 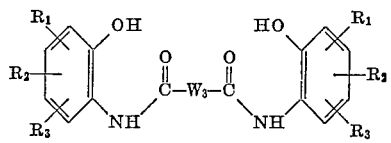

and (9) 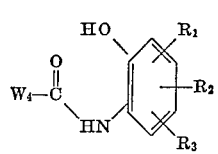

In these Formulae 8 and 9 the bivalent residue $W_3$ corresponds to the bridge members mentioned in connection with the Formulae 6a to 6g, while the residue $W_4$ corresponds to the residues mentioned in connection with the Formulae 7a to 7k. In the Formulae 5, 8 and 9 the substituents $R_1$ to $R_3$ have the following meanings: $R_1$ and $R_2$ may be identical or different and each represents a hydrogen atom, a halogen atom such as fluorine, bromine or especially chlorine, a linear or branched alkyl group containing up to 18 carbon atoms, for example methyl, ethyl, propyl, isopropyl, butyl, isobutyl, tertiary butyl, isoamyl, n-hexyl, n-octyl, 2-ethylhexyl, n-nonyl, n-dodecyl, n-octadecyl or a residue of the formula (10a) 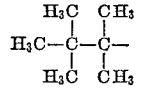

or (10b) 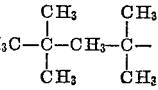

or a cycloalkyl group containing 5 or 6 cyclic members, especially cyclohexyl, a phenylalkyl group, for example benzyl or cumyl, an aryl group, for example phenyl, methylphenyl, chlorophenyl, methoxyphenyl, ethoxyphenyl, isopropoxyphenyl or n-octoxyphenyl, an alkenyl group, a hydroxyalkyl, alkoxyalkyl or halogenalkyl group, a hydroxyl group, an alkoxy group containing up to 18 carbon atoms, for example methoxy, ethoxy, propoxy, isopropoxy, n-butoxy, isobutoxy, tertiary butoxy, amoxy, isoamoxy, hexoxy, octoxy, nonoxy or n-octadecoxy group, an aralkoxy group, a phenoxy group, for example phenoxy or chlorophenoxy, a nitrile or cyanoalkyl group, for example cyanoethyl, a carboxyl group, a carboxylic acid ester group containing up to 18 carbon atoms, for example carboxylic acid alkyl ester, alkoxyalkyl ester, alkenyl ester, aryl ester or aralkyl ester groups, a carboxylic acid amide group which may be substituted by alkyl, aralkyl, cycloalkyl or aryl groups, a carboxylic acid hydrazide group, a carboxyalkyl or carbalkoxyalkyl group containing up to 12 carbon atoms, for example carboxyethyl, carboxyisopropyl or carbomethoxyethyl, a sulphonic acid group, a sulphonic acid ester group containing up to 18 carbon atoms, for example sulphonylalkyl or sulphonylaryl ester groups, a sulphonamide group which contains up to 12 carbon atoms and may be substituted by alkyl or aryl groups, an alkylsulphone or arylsulphone group, for example methylsulphone or phenylsulphone, or an amino group which may be substituted by alkyl, hydroxyalkyl or acyl radicals, and where $R_1$ and $R_2$ together with two vicinal carbon atoms of the benzene ring may form a six-membered alicyclic system, and $R_3$ represents a hydrogen atom or a lower alkyl group containing 1 to 4 carbon atoms.

For practical purposes there are especially valuable compounds of the general formula

(11)
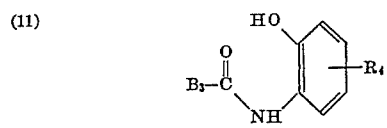

where $B_3$ represents one of the following residues:

(12a)
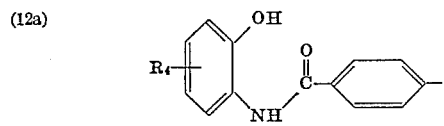

(12b)
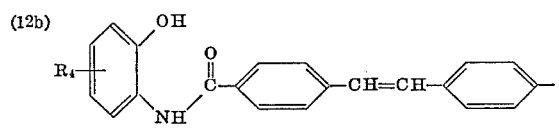

(12c)
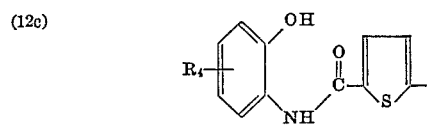

(12d)
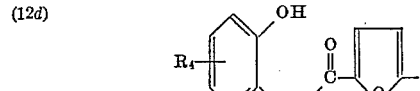

(12e)
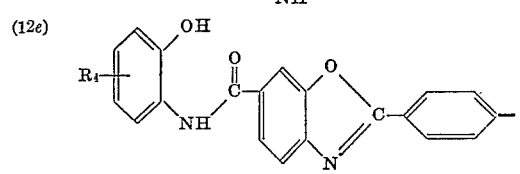

(12f)
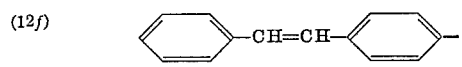

(12g)
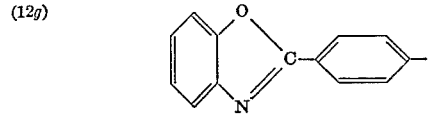

(12h)
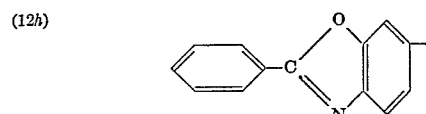

(12i)
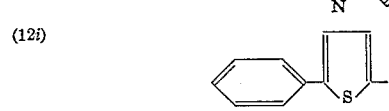

and $R_4$ stands for a hydrogen atom, a phenyl group, an alkyl group containing 1 to 8 carbon atoms, a carboxylic acid alkyl ester group with 1 to 4 carbon atoms in the alkyl group, or a phenylalkyl grouping whose alkyl group contains up to 4 carbon atoms.

The ortho-hydroxyacylamino compounds of the general Formula 1 can be prepared by known methods. According to a generally applicable manufacturing method, for example a carboxylic acid halide of the Formula 13, especially a carboxylic acid chloride, is reacted with $n$ ortho-amino compounds of the Formula 14 according to the following scheme:

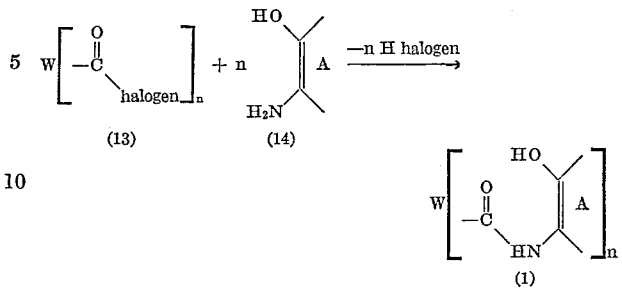

where A, W and $n$ have the above meanings. The reaction of the two reactants of the Formulae 13 and 14 is preferably performed in the presence of an inert organic solvent such as toluene, xylene, chlorobenzene, dichlorobenzene, trichlorobenzene or nitrobenzene at a temperature from 100 to 200° C. When the starting material to be used is a carboxylic acid chloride, it can be prepared immediately before the condensation with the ortho-amino compound and without isolation from the free carboxylic acid and thionylchloride, optionally in the presence of a catalyst, such as pyridine or dimethylformamide, in the same solvent in which subsequently the condensation is performed.

The ortho-hydroxyacylamino compounds of the general Formula 1 to be used in the present invention are themselves not optical brighteners, but they can be converted at a temperature from 150 to 350° C., preferably in the presence of a catalyst and of a suitable solvent, into the oxazole compounds of the Formula 15 by the following scheme of reactions:

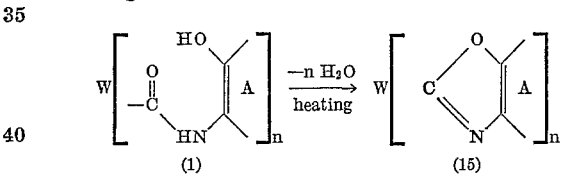

where W, A and $n$ have the meanings defined above.

The oxazole compounds obtained in this manner display in the dissolved or finely dispersed state a more or less pronounced fluorescence which enables them to be used as optical brighteners.

According to the present invention the conversion of the ortho-hydroxyacylamino compounds of the Formula 1 into the oxazole compounds of the Formula 15 is carried out in the substrate itself, that is to say in the synthetic organic polymeric materials or in the mixture used for their formation; for this purpose the ortho-hydroxyacylamino compound is incorporated in these substrates or the mixtures from which they are formed, after the homogeneous and extremely fine distribution of the ortho-hydroxyacylamino compound of the Formula 1, and the mixture is then heated to a temperature of at least 150° C. or preferably from 250 to 300° C. (In a large number of cases a temperature of at least 200° C. will suffice, however.) The reaction times vary considerably, depending on the reactivity and thermostability of the starting compounds, and in most cases they will range from a few minutes to about 20 to 30 hours. Depending on the nature of the individual synthetic organic substance the heat treatment may be performed at different stages of the manufacture of the shaped structure. Thus, in the case of thermoplastic materials the shaping operation, for example the melt spinning, extrusion, calendering, rolling, pressing or injection moulding, may at the same time constitute an operation in the formation of the optical brightener, provided the requisite temperature limit is attained during such operation. Examples of such thermoplasts are modified natural substances, such as the different cellulose esters and mixed esters (cellulose acetate), cellulose ethers, polycondensates such as saturated polyesters (polyethylene terephthalate), polyamides (polyhexamethylenediamine adipate, polycaprolactan), aniline-based synthetic resins, polycarbonates, polymers such as poly-α-olefines (polyethylene, polypropylene, and their copolymers), polystyrene, polyvinylchloride and polyvinylidenechloride, polyisobutylene, polyacrylates (especially also their copolymers), polyacrylonitrile, polyfluorolefines, polyoxymethylenes, and polyadducts such as linear polyurethanes. Thus, the ortho-hydroxyacylamino compounds concerned may be added to the moulding compositions or processing masses in the manufacture of films, foils, tapes, wires, envelopes or the like, whereupon the mixture is finely dispersed and then shaped (dissolution in the mass, sprinkling in a granulate, stirring in and melting). In the case of durothermosetting resins the most advantageous processing method consists in homogeneously incorporating the acylamino compounds to be used in the present invention in the starting mixtures used for the preparation of these plastics and then curing the mixture. In this case, too, provided that the requisite minimum temperature is reached anyway during the curing operation, a separate heat treatment, which must otherwise fellow in some form or other, may be dispensed with.

As examples of such durothermosetting resins that can be brightened by the present process there may be mentioned from among modified natural products, for example the casein plastics; from the polycondensates the synthetic materials based on alkyd resins, maleinate resins, phenolic resins, carbamide resins, melamine resins or silicones; from the polymer series the plastic materials based on allyl ester resins and unsaturated polyester resins; from the polyadducts the epoxy resin plastics or the cross-linked polyurethanes.

The ortho-hydroxyacylamino compounds of the kind defined above may be added, for example, to the polymerization masses before or during the homopolymerization or copolymerization of monomers, or to the reaction mixtures before or during the polycondensation or polyaddition. Particularly in the latter case—that is to say on addition before or during a polycondensation or polyaddition—this procedure may, of course, be adopted only if the reactants or assistants used in the polycondensation or polyaddition respectively are free from reactive groups capable of reacting with free hydroxyl groups or amino groups at temperatures within the range from 150 to 300° C.

In the course of the formation and shaping of a considerable series of synthetic materials, especially those from polyesters, polyamides and polyolefins, heating to a temperature above 200° C. is required anyway so that the present process for the manufacture of shaped structures from these materials optically brightened with oxazole compounds constitutes a substantial simplification of the manufacturing process. The last stage of the synthesis leading to the oxazole compounds of the Formula 15 would otherwise require a considerable technical investment, such as high reaction temperatures, specially suited solvents, selected catalysts and often time-consuming purifying operations, which are not needed in the present process. Finally, the yield obtained in this stage of the synthesis of the separate manufacture of the pure oxazole compounds is far from quantitative. It is, therefore, all the more surprising that the additional use of the ortho-hydroxyacylamino compounds of the Formula 1 under the conditions described above not only allows the smooth formation of the oxazole ring but in fact leads to a practically equivalent optical brightening effect as is obtained by adding a pre-formed oxazole compound of the Formula 15.

In the present process there may be used for brightening saturated polyesters, polyamides or poly-α-olefines quite generally and with special advantage—in an amount of 0.005 to 1.5%, preferably from 0.005 to 0.2% referred to the weight of the material to be brightened—any acylamino compound of the formula

(16)
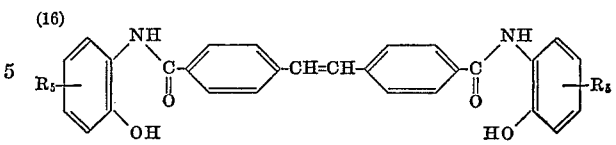

where $R_5$ represents a hydrogen atom, an alkyl group containing 1 to 8 carbon atoms or a carboxylic acid alkyl ester group whose alkyl residue contains 1 to 4 carbon atoms.

The present process is of considerable practical importance in the manufacture of optically brightened shaped structures—especially fibrous materials—from aromatic, saturated polyesters, especially polyethylene terephthalates, for which purpose there are used with special advantage acylamino compounds of one of the formulae

(17)
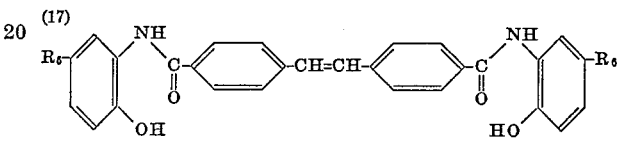

(18)
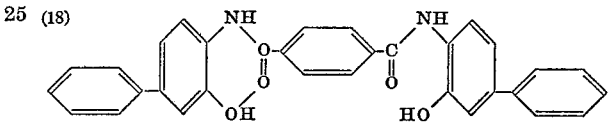

(19)
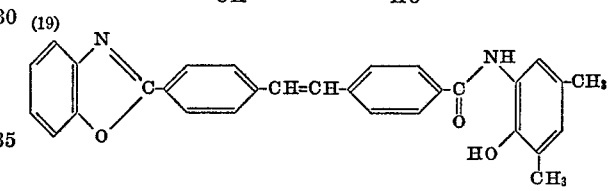

where $R_6$ represents a hydrogen atom, an alkyl group containing 1 to 4 carbon atoms or a carboxylic acid alkyl ester group whose alkyl residue contains 1 to 4 carbon atoms.

Hardly less important is the optical brightening of synthetic polyamides such, for example, as hexamethylenediamine adipates or polycaprolactams, above all in the form of fibre substrates, with oxazole compounds of the general type represented by the Formula 1. Particuarly good results have been obtained in the latter case with acylamino compounds of the formula

(20)
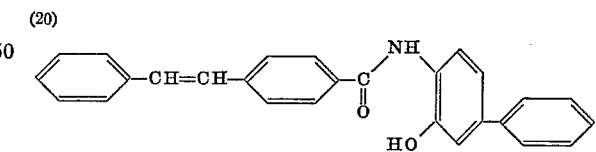

(21)
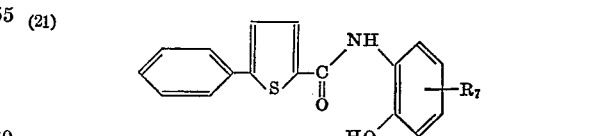

(22)
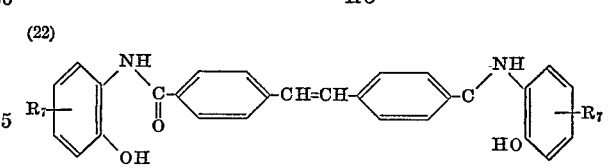

in which $R_7$ represents a carboxylic acid alkyl ester group whose alkyl residue contains 1 to 4 carbon atoms.

Within the scope of the above selected combination of reactants the acylamino compounds, thus especially those of the Formulae 16 to 22, are used in mixtures with the said polymeric substances preferably in the melt spinning process for these polymeric substances at temperatures of about 200 to 300° C. Of course, this does not exclude any use of these combinations according to other methods, for example in the manufacture of foils by the calender or blow-forming methods.

The amount of ortho-hydroxyacylamine compound to be used in the present invention, referred to the weight of the material to be optically brightened, may vary within wide limits. Even a very small quantity, in some cases for instance as little as 0.005%, may suffice to produce a distinct and durable effect, though amounts of up to about 0.5% or more may be used equally well. In general, practically useful amounts will vary from 0.005 to 0.2% referred to the weight of the material to be optically brightened.

Furthermore, the ortho-hydroxyacylamino compounds of the kind defined above may also be used in admixture with dyestuffs to produce brilliant pastel shades, white pigments, light filters, antioxidants and heat stabilizers.

The following manufacturing instructions exemplify the preparation of the ortho-hydroxyacylamine compounds and the examples illustrate their application. Unless otherwise indicated, parts and percentages are by weight.

MANUFACTURING INSTRUCTIONS

(A)

A suspension of 7.3 parts of stilbene-4-carboxylic acid chloride and 5.6 parts of 1-amino-2-hydroxy-4-phenyl-benzene in 150 parts by volume of anhydrous toluene is refluxed for 4 hours, after which no more hydrochloric acid is being liberated. The light-beige coloured suspension is suctioned at room temperature and the residue washed with methanol and dried, to yield about 8.7 parts of the amide of the formula (20)

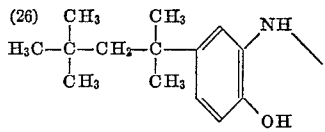

as a light-beige coloured powder which melts at 250° C. with decomposition. After two recrystallizations from dioxane it forms faintly yellow needles melting at 256° C. with decomposition.

$C_{27}H_{21}O_2N$. Mol. weight: 391.45. Calculated: C, 82.84%; H, 5.41%; N, 3.58%. Found: C, 82.55%; H, 5.37%; N, 3.36%.

(B)

When 33.4 parts of 5-phenylthiophene-2-carboxylic acid chloride and 25 parts of 4-amino-3-hydroxybenzoic acid methyl ester are refluxed for 4 hours in 500 parts by volume of dry xylene, there are obtained about 49.5 parts of the amide of the formula (23)

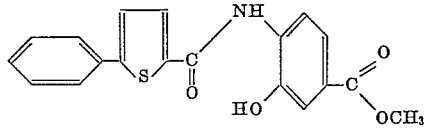

as a light-beige coloured powder which melts with decomposition at 267° C. After two recrystallizations from dioxane it forms faintly yellow bundles of needles which melt at 268° C. with decomposition.

$C_{19}H_{15}O_4NS$. Mol. weight: 353.33. Calculated: C, 64.58%; H, 4.28%; N, 3.96%. Found: C, 64.82%; H, 4.36%; N, 3.83%.

(C)

A suspension of 4.2 parts of thiophene-2,5-dicarboxylic acid chloride and 5 parts of 1-hydroxy-2-amino-4-methylbenzene in 250 parts by volume of anhydrous xylene is heated to refluxing within one hour, during which a strong evolution of hydrochloric acid sets in. After 6 hours' refluxing the liberation of hydrochloric acid ceases. The thick, yellow suspension is cooled to room temperature (about 20° C.), suction-filtered and the residue is washed with methanol and dried, to yield about 7 parts of the diamide of the formula (24)

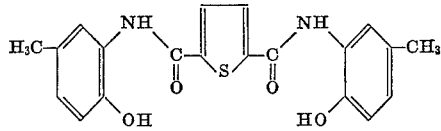

in the form of a greenish yellow powder which melts at 284° C. with decomposition. Crystallization from aqueous dimethylformamide furnishes light brown, small needles having the same melting point.

$C_{20}H_{18}O_4N_2S$. Mol. weight: 382.44. Calculated: C, 62.81%; H, 4.74%; N, 7.33%. Found: C, 62.68%; H, 4.89%; N, 7.60%.

In a similar manner 4-amino-3-hydroxybenzoic acid ethyl ester gives rise to the diamide of the formula (25)

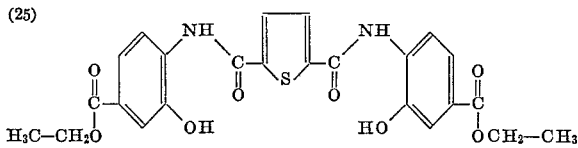

in the form of a yellowish, finely crystalline powder from dimethylformamide, melting at 310° C. with decomposition.

$C_{24}H_{22}O_8N_2S$. Mol. weight: 498.51. Calculated: C, 57.83%; H, 4.45%; N, 5.62%. Found: C, 57.73%; H, 4.38%; 5.57%.

(D)

A suspension of 6.1 parts of stilbene-dicarboxylic acid chloride and 8.9 parts of 4-hydroxy-3-amino-(1',1''',3',3'''-tetramethyl-butyl)-benzene in 250 parts by volume of anhydrous xylene is heated within one hour to refluxing, during which liberation of hydrochloric acid sets in and is complete after 6 hours' boiling. The thinly liquid, light-beige coloured suspension is cooled to room temperature (about 20° C.), suctioned and the residue is washed with methanol and dried, to yield about 12.1 parts of the diamide of the formula.

(26) 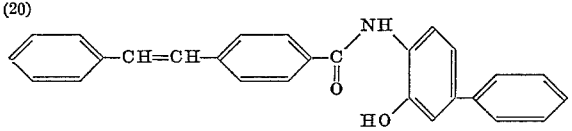

as a light-beige coloured powder which melts at 315° C. with decomposition and, after two recrystallizations from dimethylformamide-alcohol, forms dull yellow, small needles melting at 318° C. with decomposition.

$C_{44}H_{54}O_4N_2$. Mol. weight: 674.89. Calculated: C, 78.30%; H, 8.07%; N, 4.15%. Found: 78.31%; H, 8.18%; N, 4.13%.

In an analogous manner the following diamides can be prepared from the corresponding 1-amino-2-hydroxy-benzene compounds:

(27)

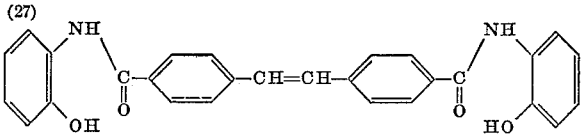

Colourless platelets from dimethylformamide-alcohol, melting at 310° C. with decomposition.

$C_{28}H_{22}O_4N_2$. Mol. weight: 450.47. Calculated: C, 74.65%; H, 4.92%; N, 6.22%. Found: C, 74.35%; H, 4.95%; N, 6.14%.

(28)

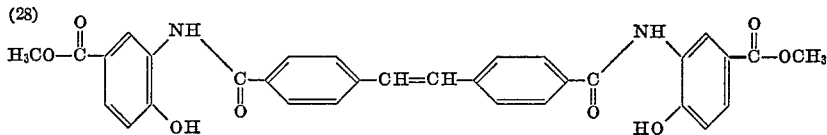

Light-yellow, crystalline powder from dimethylformamide-alcohol, melting at 335° C. with decomposition.

$C_{32}H_{26}O_8N_2$. Mol. weight: 566.54. Calculated: C, 67.84%; H, 4.63%; N, 4.95%. Found: C, 67.46%; H, 4.65%; H, 5.07%.

(E)

A mixture of 9.6 parts of furan-2,5-dicarboxylic acid chloride, 18.5 parts of 1-amino-2-hydroxy-4-phenylbenzene and 600 parts by volume of xylene is refluxed for 10 hours, then cooled to room temperature (about 20° C.), suction-filtered, and the residue is washed with methanol and dried, to yield about 18.7 parts of the diamide of the formula (29)

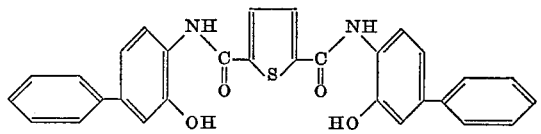

in the form of a yellowish green powder which melts at 320° C. with decomposition and, after crystallization from dimethylformamide-alcohol, forms yellow, small needles melting at 335° C. with decomposition.

$C_{30}H_{22}O_5N_2$. Mol. weight: 490.49. Calculated: C, 73.46%; H, 4.52%; N, 5.71%. Found: C, 73.60%; H, 4.42%; N, 5.75%.

In an analogous manner terephthalic acid dichloride furnishes the diamide of the formula (18)

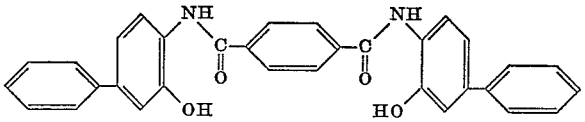

in the form of dark-yellow flakes from dimethylformamide, which melt at 345° C. with decomposition.

$C_{32}H_{24}O_4N_2$. Mol. weight: 500.53. Calculated: C, 76.78%; H, 4.83%; N, 5.60%. Found: C, 76.71%; H, 4.79%; N, 5.64%.

(F)

A mixture of 6.5 parts of 1,4-dibenzoxazolyl-(2′,2″)-benzene-6′,6″-dicarboxylic acid chloride of the formula (30)

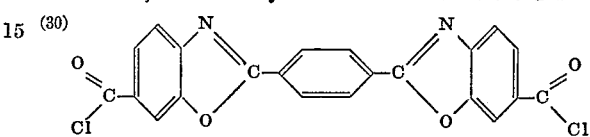

5 parts of 1-amino-2-hydroxy-4-tertiary butyl-benzene and 150 ml. of anhydrous xylene is refluxed for 4 hours, after which the liberation of hydrochloric acid ceases. The batch is suction-filtered at room temperature and the residue washed with methanol and dried, to yield about 9.8 parts of the diamide of the formula

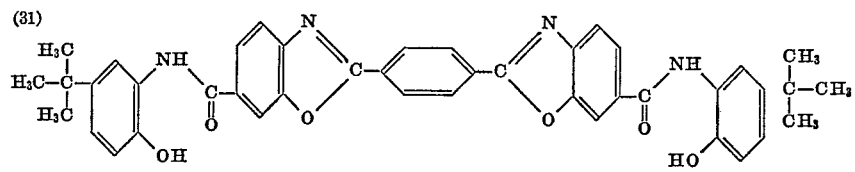

as a light-beige coloured powder melting above 350° C. After two recrystallizations from dimethylformamide it forms blunt, yellow flakes melting above 350° C.

$C_{42}H_{38}O_6N_4$. Mol. weight: 694.76. Calculated: C, 72.60%; H, 5.51%; N, 8.06%. Found: C, 72.34%; H, 5.34%; N, 8.12%.

The 1,4 - dibenzoxazolyl - (2′,2″)-benzene-6′,6″-dicarboxylic acid chloride of the Formula 30, used as starting material, can be prepared by known methods. Terephthalic acid dichloride is reacted with 4-amino-3-hydroxybenzoic acid methyl ester in anhydrous xylene to form the corresponding diamide. After having subsequently performed the cyclization, the corresponding dibenzoxazolyl-dicarboxylic acid methyl ester is hydrolysed and the dicarboxylic acid converted with thionylchloride into the dicarboxylic acid chloride of the Formula 30.

(G)

A mixture of 14.4 parts of benzoxazolyl-(2′)-benzene-4,6′-dicarboxylic acid chloride of the formula (32)

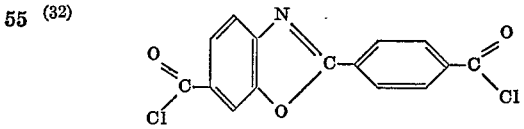

and 20.5 parts of 1-hydroxy-2-amino-4-cumylbenzene is refluxed for 6 hours, after which the elimination of hydrochloric acid ceases. The batch is suction-filtered at room temperature (about 20° C.) and the residue washed with methanol and dried, to yield about 29.4 parts of the diamide of the formula (33)

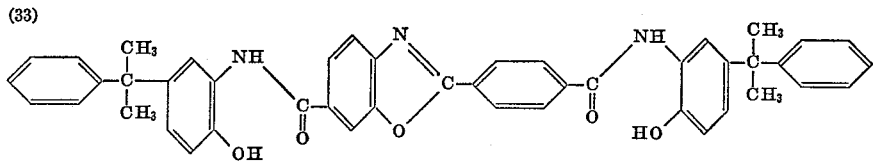

as a light-beige coloured powder which melts at 279° C. with decomposition and after crystallization from aqueous dioxane forms a yellow, crystalline powder which melts at 280° C. with decomposition.

C₄₅H₃₉O₅N₃. Mol. weight: 701.79. Calculated: C, 77.01%; H, 5.60%; N, 5.99%. Found: C, 76.87%; H, 5.46%; N, 5.99%.

The starting material, the benzoxazolyl-(2')-4,6'-dicarboxylic acid chloride of the Formula 32, can be prepared by known methods. Terephthalic acid methyl ester chloride is reacted with 4-amino-3-hydroxybenzoic acid methyl ester in anhydrous xylene to form the corresponding amide. After cyclization the resulting benzoxazolyl-(2')-benzene-4,6'-dicarboxylic acid methyl ester is hydrolysed and the dicarboxylic acid converted with thionylchloride into the dicarboxylic acid chloride of the Formula 32.

(H)

A suspension of 1.4 parts of 4-benzoxazolyl-(2')-stilbene-carboxylic acid chloride of the formula

(34)
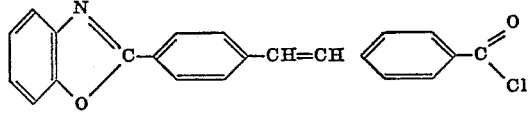

0.55 part of 1-amino-2-hydroxy-3,5-dimethylbenzene and 50 parts by volume of anhydrous toluene is heated within 2 hours to refluxing, during which hydrochloric acid is liberated. The batch is then cooled to room temperature (about 20° C.), suctioned and the residue washed with methanol and dried, to yield about 1.6 parts of the amide of the formula

(19)
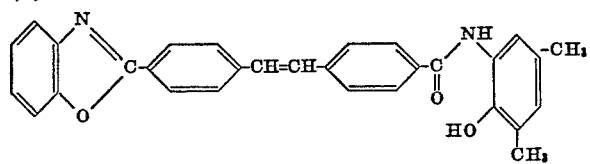

as a beige coloured powder which melts at 250° C. with decomposition and after crystallization from dimethyl-formamide-alcohol forms a pale yellowish, crystalline powder having the same melting point.

C₃₀H₂₄O₃N₃. Mol. weight: 460.51. Calculated: C, 78.24%; H, 5.25%; N, 6.08%. Found: C, 77.98%; H, 5.24%; N, 5.86%.

The starting material used, 4-benzoxazolyl-(2')-stilbene-carboxylic acid chloride, is prepared by known methods. Stilbene-4,4'-dicarboxylic acid methyl ester chloride is reacted in anhydrous xylene to form the corresponding

(38)
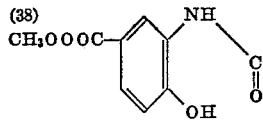

amido compound. After having performed the ring closure, the corresponding benzoxazolyl-carboxylic acid methyl ester is hydrolysed and the free carboxylic acid converted with thionylchloride into the acid chloride of the Formula 34.

(J)

A mixture of 6.0 parts of 5-[5'-tertiary butylbenzoxzolyl-(2')]-thiophene-2-carboxylic acid of the formula

(35)
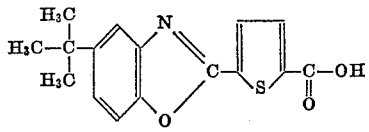

70 parts by volume of toluene, 20 parts of thionyl chloride and 3 drops of pyridine is heated for 4 hours at 90 to 95° C., after which the evolution of hydrochloric acid gas ceases. The excess thionylchloride together with the solvent is then completely evaporated under vacuum. The acid chloride is then dissolved at room temperature in 100 parts by volume of anhydrous xylene, 3.3 parts of 4-tertiary butyl-2-amino-1-hydroxybenzene are added and the whole is refluxed for 3 hours, during which hydrochloric acid gas escapes. The resulting suspension is then suctioned at room temperature and washed with xylene and alcohol. Crystallization from ethyl acetate furnishes about 4 parts of the compound of the formula

(36)
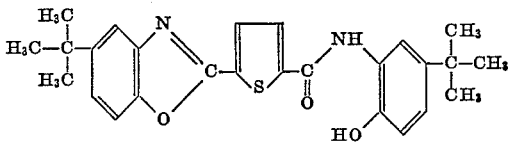

in the form of yellow flakes melting at 255 to 256° C. When the compound is once more crystallized from much alcohol, its melting point remains the same.

C₂₆H₂₈O₃N₂S. Mol. weight: 448.59. Calculated: C, 69.61%; H, 6.29%; N, 6.25%. Found: C, 69.51%; H, 6.31%; N, 5.96%.

The starting material, 5-[5-tertiary butylbenzoxazolyl-(2')]-thiophene-2-carboxylic acid, is prepared by known methods. Thiophene-2,5-dicarboxylic acid methyl ester chloride is reacted with 4-tertiary butyl-2-amino-1-hydroxybenzene in anhydrous xylene to form the corresponding amido compound. Cyclization by a known method is performed, and the corresponding benzoxazolyl-carboxylic acid methyl ester is hydrolysed and from the sodium salt the free carboxylic acid of the Formula 35 prepared.

(K)

A mixture of 84.5 parts of the carboxylic acid chloride of the formula

(37)
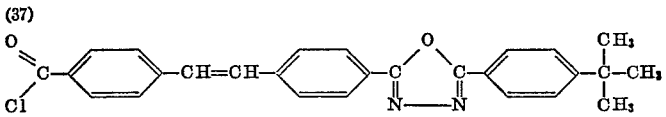

1200 parts by volume of anhydrous xylene and 31.9 parts of 3-amino-4-hydroxybenzoic acid methyl ester is refluxed overnight, during which hydrochloric acid gas escapes. The resulting suspension is suction-filtered at room temperature, covered with xylene and the residue is washed with methanol and dried, to yield about 107 parts of a yellow-beige powder which melts at 295° C. with decomposition. Crystallization from ethyleneglycol monomethyl ether with addition of active carbon furnishes the compound of the formula

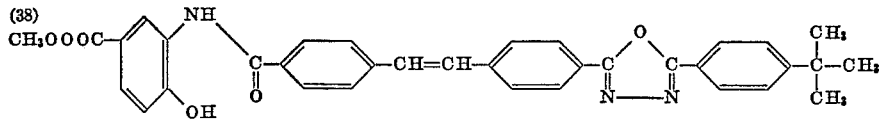

in the form of light-beige flakes which melt at 304° C. with decomposition.

C₃₅H₃₁O₅N₃. Mol. weight: 573.62. Calculated: C, 73.28%; H, 5.45%; N, 7.33%. Found: C, 72.97%; H, 5.51%; N, 7.21%.

The carboxylic acid chloride of the Formula 37, used as starting material, is prepared in the following manner:

Stilbene-4,4'-dicarboxylic acid methyl ester chloride is reacted with 4-tertiary butylbenzhydrazide in anhydrous dichlorobenzene with addition of an equivalent quantity of anhydrous pyridine to yield the corresponding diacylhydrazine compound. Then, by dropping in an equimolecular proportion of thionylchloride at 150° C. the oxdiazole ring is closed. The resulting oxdiazolyl-stilbenyl-carboxylic acid methyl ester is then hydrolysed by a known method and the free carboxylic acid converted with thionylchloride into the acid chloride of the Formula 37.

Example 1

A melt from 100 g. of terephthalic acid ethyleneglycol polyester and 0.05 g. of the compound of the formulae

(19)
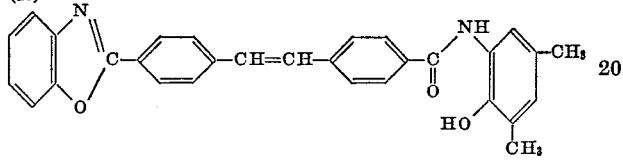

(27)
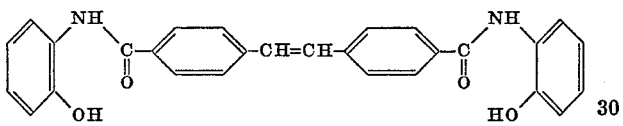

is heated according to the conventional melt spinning process for 2 hours at 285° C. and then expressed through a spinneret under a nitrogen pressure of 8 atmospheres to form a filament. The polyester filament produced in this manner has a substantially higher white content that a filament to whose spinning mass the compound of the Formulae 19, 27, 28, 20, 31, 33 or 26 has not been added.

Example 2

(a) 1 kg. of a polyamide in chip form, prepared in known manner from hexamethylenediamine adipate, is rolled for 12 hours in a tumbler with 30 g. of titanium dioxide (rutile modification) and 10 g. of the compound of one of the formulae

(23)
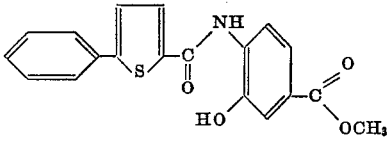

(28)
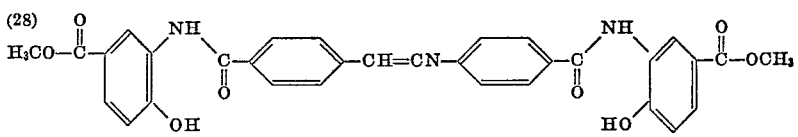

(20)
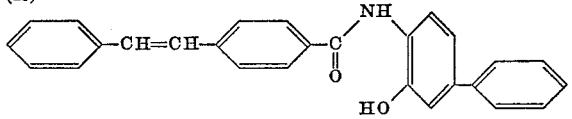

(31)
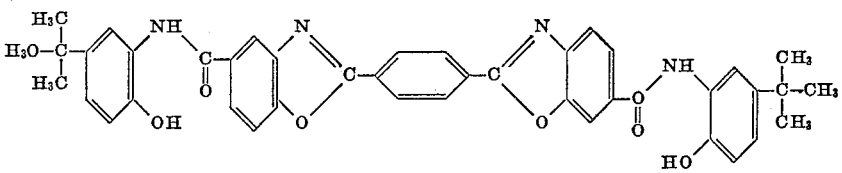

(33)
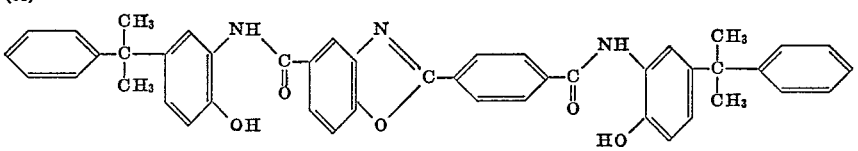

or

(26)
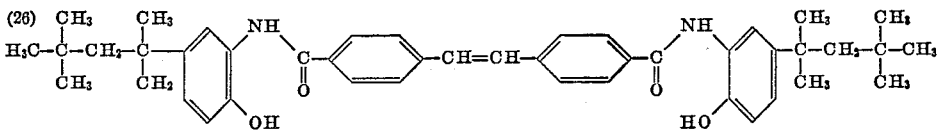

(28)
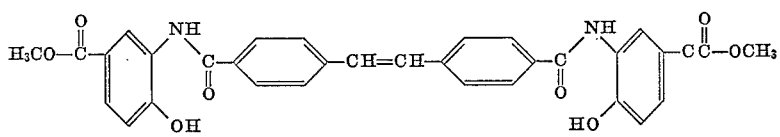

(18)
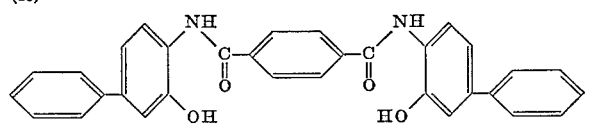

(31)
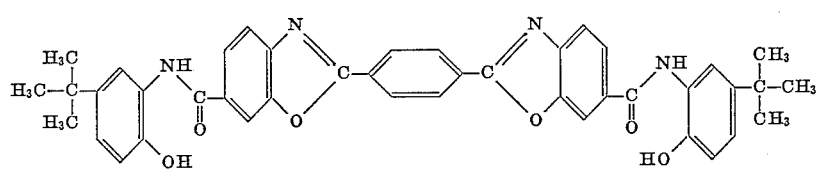

(19)
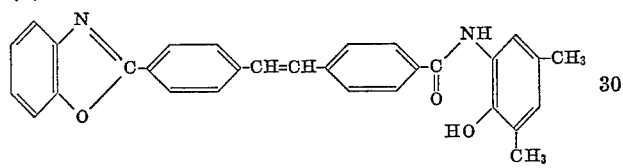

The chips treated in this manner are then stirred for 45 minutes in a boiler from which the atmospheric oxygen has been displaced with steam and which is heated at 300 to 310° C. by means of oil or diphenyl vapour. The melt is then expressed through a spinneret under a nitrogen pressure of 5 atmospheres to form a filament which is allowed to cool and then wound on a spinning bobbin. The filaments thus obtained have a substantially higher white content than filaments obtained from a spinning mass that does not contain the compound of the Formulae 23, 28, 18, 31 or 19.

(b) When instead of hexamethylenediamine adipate an equal quantity of ε-caprolactam is used, similarly good results are obtained.

Example 3

(a) 100 grams of polypropylene (fibre grade) are intimately mixed with 0.8 g. of the compound 18 and melted with stirring at 280 to 290° C. The melt is expressed by the known melt spinning process through conventional spinnerets and stretched. The resulting polypropylene fibres display an excellent brightening effect which is fast to light.

(b) High-pressure polyethylene is diluted with 1.5% (referred to its own weight) of a compound of the Formula 19 or with 1.2% of a compound of the Formula 23 and then converted by the usual foil blow-forming process into thin foils at an upper cylinder temperature of 180° C. These foils display a very striking, higher white effect than those which have been manufactured in the absence of the afore-mentioned brighteners.

What is claimed is:

1. A thermoplastic resin suitable for shaping, containing 0.001 to 0.5%, referred to the weight of the plastic mass, of at least one acylamino compound selected from the group consisting of the formulae where $R_6$ represents a member selected from the group consisting of a hydrogen atom, an alkyl group with 1 to 4 carbon atoms and a carboxylic acid alkyl ester group whose alkyl residue contains 1 to 4 carbon atoms.

2. Melt spinning thermoplastic resin mass containing 0.005 to 0.2% by weight of an acylamino compound of the formulae

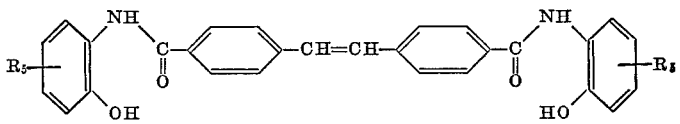

where $R_5$ represents a member selected from the group consisting of an alkyl group containing 1 to 8 carbon atoms and a carboxylic acid alkyl ester group whose alkyl residue contains 1 to 4 carbon atoms.

References Cited

UNITED STATES PATENTS

| | | | |
|---|---|---|---|
| 2,213,193 | 9/1940 | Kirst | 8—46 |
| 3,133,916 | 5/1964 | Duennenberger et al. | |
| 3,136,773 | 6/1964 | Maeder et al. | |
| 3,260,715 | 7/1966 | Saunders. | |
| 3,262,929 | 7/1966 | Okubo et al. | |

TOBIAS E. LEVOW, Primary Examiner

J. COOPER, Assistant Examiner

U.S. Cl. X.R.

260—37, 40, 41, 240

CASE 5563/E

PO-1050
(5/69)

UNITED STATES PATENT OFFICE
CERTIFICATE OF CORRECTION

Patent No. 3,455,837          Dated  July 15, 1969

Inventor(s)  ERWIN MAEDER ET AL

It is certified that error appears in the above-identified patent and that said Letters Patent are hereby corrected as shown below:

Column 18, second formula, line 32-33

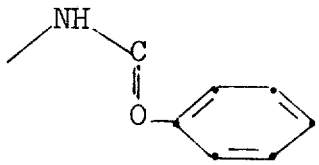

should read:

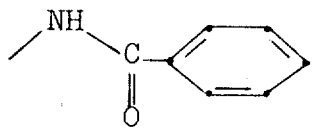

Column 18, line 52, after "the", delete "formulae" and substitute --- formula ---.

SIGNED AND
SEALED
DEC 8 1970

(SEAL)
Attest:

Edward M. Fletcher, Jr.
Attesting Officer

WILLIAM E. SCHUYLER, JR.
Commissioner of Patents